United States Patent [19]

Lien

[11] Patent Number: 4,902,417

[45] Date of Patent: Feb. 20, 1990

[54] SPIRAL-WOUND MEMBRANE CARTRIDGE WITH RIBBED AND SPACED CARRIER LAYER

[75] Inventor: Larry A. Lien, Solana Beach, Calif.

[73] Assignee: Desalination Systems, Inc., Escondido, Calif.

[21] Appl. No.: 206,560

[22] Filed: Jun. 14, 1988

[51] Int. Cl.[4] ............................................. B01D 13/00
[52] U.S. Cl. ..................... 210/321.74; 210/321.83; 210/497.2; 55/498; 55/520
[58] Field of Search ............... 55/484, 485, 498, 500, 55/520; 210/321.74, 321.83, 497.1, 497.2

[56] References Cited

U.S. PATENT DOCUMENTS

| | | | |
|---|---|---|---|
| 3,668,837 | 6/1972 | Grass | 210/321.74 |
| 4,192,748 | 3/1980 | Hyden | 210/321.74 |
| 4,225,438 | 9/1980 | Miller et al. | 210/321.74 |
| 4,271,023 | 6/1981 | Giovannetti et al. | 210/321.74 |
| 4,500,426 | 2/1985 | Ishii et al. | 210/321.74 |

FOREIGN PATENT DOCUMENTS

| | | |
|---|---|---|
| 0146298 | 6/1985 | European Pat. Off. |
| 2305405 | 8/1973 | Fed. Rep. of Germany ........................ 210/321.74 |
| 2186906 | 2/1986 | Japan ............................... 210/321.74 |

Primary Examiner—Richard V. Fisher
Assistant Examiner—Wanda L. Millard
Attorney, Agent, or Firm—Fitch, Even, Tabin & Flannery

[57] ABSTRACT

Disclosed are spiral-wound membrane cartridge constructions for use in ultrafiltration and reverse-osmosis separation equipment, each of which include a feed layer, a membrane layer and a permeate carrier layer. By using a feed layer in the form of a channel material having a plurality of parallel ribs extending in an axial direction, interconnected by a matrix of smaller filaments which may be generally perpendicular thereto, this construction advantageously reduces resistance to liquid flow axially through the cartridge, registering only very low pressure drops. Such cartridges of 40 to 70 inches in length and 8 inches in diameter may be employed in series, even within a single outer casing or pressure vessel. Such constructions are especially useful in separating liquids having high levels of particulate contamination using ultrafiltration membranes where clogging of the cartridge is a common problem and also in concentrating solutions of fairly viscous water-soluble polymers.

16 Claims, 2 Drawing Sheets

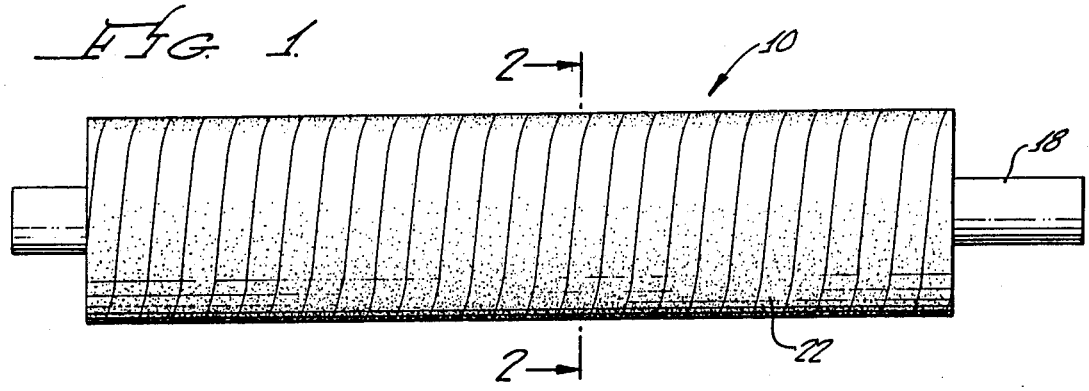
FIG. 1.
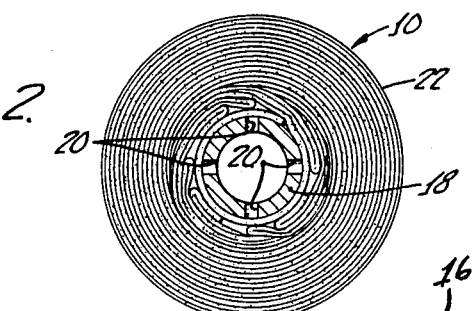
FIG. 2.
FIG. 2A.
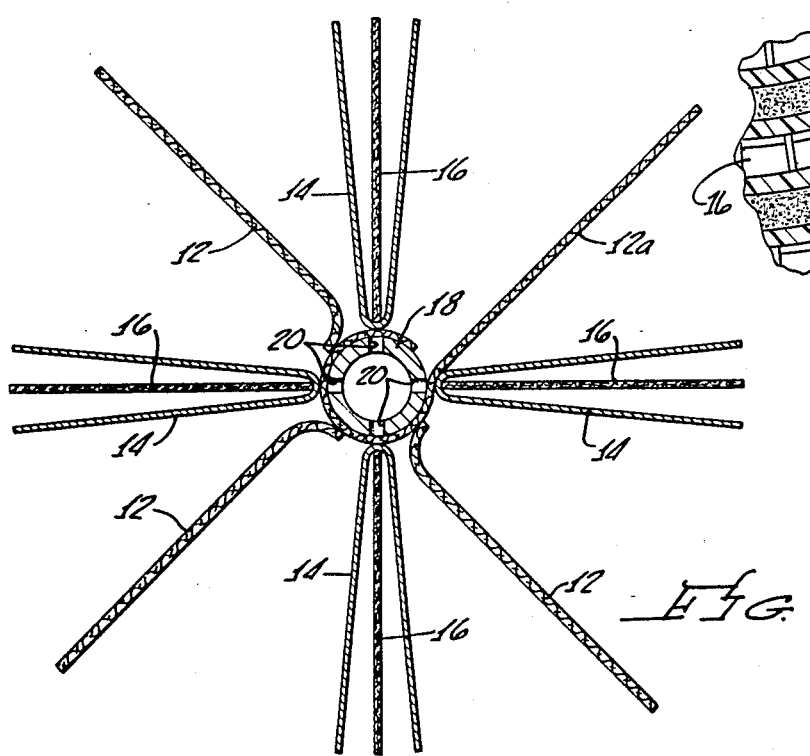
FIG. 3.

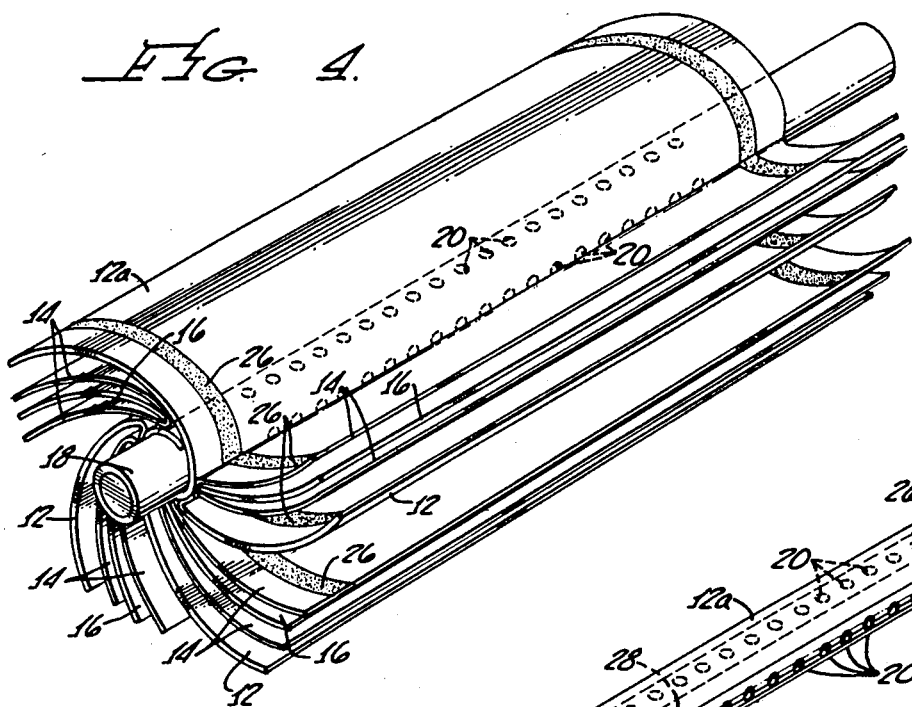
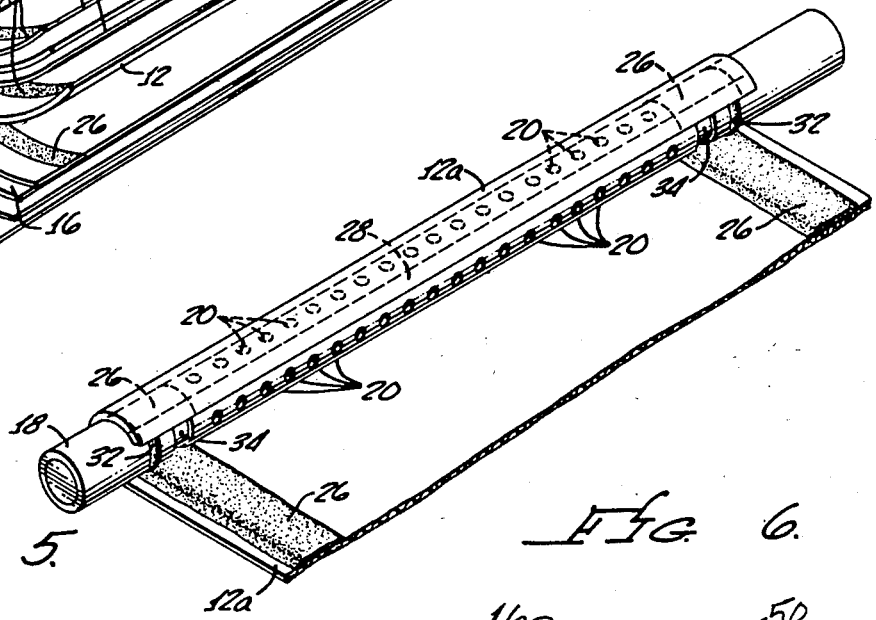
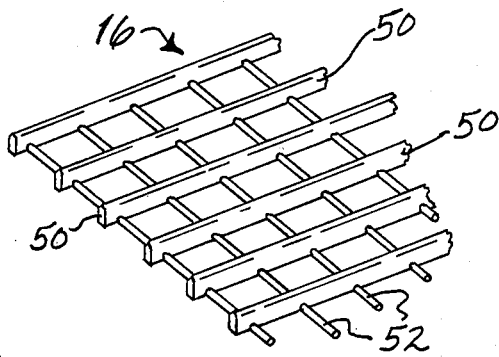
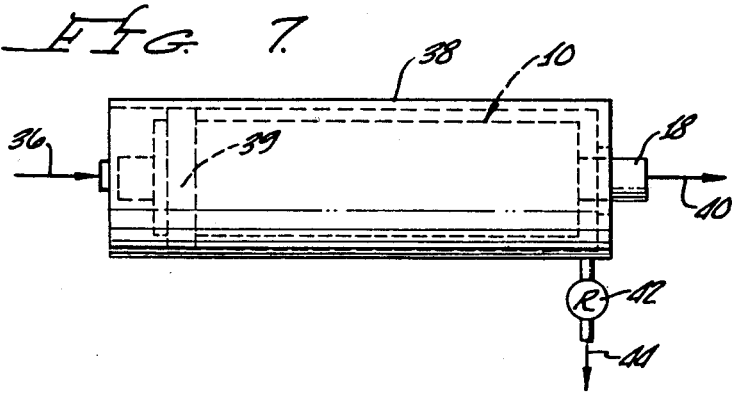

SPIRAL-WOUND MEMBRANE CARTRIDGE WITH RIBBED AND SPACED CARRIER LAYER

The present invention relates generally to ultrafiltration and more particularly to spiral-wound membrane cartridges for separating one component from a fluid component, such as separating a relatively clean liquid from a liquid mixture, and related methods of separation treatment.

BACKGROUND OF INVENTION

The use of semipermeable membranes for effecting liquid separations has become well accepted, and membranes both for ultrafiltration applications and reverse-osmosis applications are presently in use for a wide spectrum of applications, including water purification, concentration of dilute mixtures or solutions, and waste treatment and/or recovery of recyclable components. A large variety of semipermeable membranes have been developed, and spiral-wound cartridges have been one accepted type of device which has been found valuable for efficiently providing a large amount of membrane surface area within a given spatial volume. While such spiral cartridges utilizing sheetlike membranes have proved satisfactory and have given good performance in many applications, improvements in devices of this type are constantly being sought, as no single separation device has yet proven to provide the best performance in every type of situation, particularly when considering the wide variations in feed materials that are encountered. Especially troublesome are liquid feed materials that carry particulate contaminants that tend to frequently plug sheet-like semipermeable membranes and liquid feed mixtures which are high in viscosity.

Accordingly, improvements in the design of such spiral wound membrane cartridges continue to be sought after.

SUMMARY OF THE INVENTION

It has been found that the overall performance of such spiral-wound membrane cartridges can be improved by the employment of a feed or supply material of sheet-like construction such that a plurality of parallel channels are created which extend axially through the cartridge in its final spiral-wound form. These channels are created between adjacent parallel ribs of substantially uniform size that are interconnected by cross fibers or filaments which are arranged generally perpendicular thereto, the cross filaments being of much smaller size than the channel-creating ribs. In the cartridge, the spiral feed layer is flanked by sheets of semipermeable membrane through which one component of the mixture being treated permeates as the feed mixture flows from the inlet end to the outlet end of the cartridge. The openness of the channel construction is such that the pressure drop through the cartridge is rendered quite small without undesirably affecting permeation of the component being separated through the membrane and is found to be particularly effective in combination with ultrafiltration membranes.

BRIEF DESCRIPTION OF THE DRAWINGS

FIG. 1 is a front view of a membrane cartridge embodying various features of the invention;

FIG. 2 is a cross-sectional view through the cartridge taken along line 2—2 of FIG. 1;

FIG. 2A is an enlarged fragmentary view of a small portion of FIG. 2 showing the details of the structure of the leaves in the spiral winding;

FIG. 3 is a cross-sectional view similar to FIG. 2 but showing the assemblage in its unwrapped condition;

FIG. 4 is a perspective view which schematically illustrates the winding of the various leaves about the central tube;

FIG. 5 is a perspective view similar to FIG. 4 showing the attachment of a permeate carrier leaf to the central tube;

FIG. 6 is an enlarged fragmentary perspective view of the sheet-like feed material as it generally appears in FIG. 4; and FIG. 7 is a schematic assembly view, reduced in size, showing the cartridge in use within its outer pressure-resistant container.

DETAILED DESCRIPTION OF THE PREFERRED EMBODIMENTS

As seen in FIGS. 1-3, a cartridge 10 includes a multi-layer wrapping about a central tube 18 which serves as a permeate collection pipe. The sidewall of the tube 18 is porous or provided with defined openings 20 so that the permeating liquid from the spiral winding can enter the tube therethrough. Discharge can be via one or both of the open ends of the tube, or optionally, one end of the tube can be closed as in the illustrated version where the tube 18 is plugged at the inlet end. Very briefly, the incoming feed mixture enters the windings at one end, termed the input end, as indicated by the arrow in FIG. 1, flows axially through the spiral windings and out the opposite, discharge end where a substantially open spacer 19 is provided to create a plenum, as seen in FIG. 7, through which the concentrated feed mixture flows before it exits via a side concentrate outlet 44.

Throughout this description, the term "feed mixture" is used to generally describe a fluid mixture of at least two components. The materials usually being separated are either a solution of a solid or a liquid in another liquid or a mixture of two liquids; however, both of the components could be gases so that the cartridge assembly might be used to separate one gas from a mixture of two or more gases. In its travel through the windings of the cartridge from end to end, it should be understood that the permeating component will pass through the minute pores in the ultrafiltration membrane or the reverse-osmosis membrane 14 while the remainder of the feed mixture flows axially toward the discharge end, growing continuously more concentrated. The permeating component then enters into a permeate carrier material 12 and flows spirally inward therewithin until it reaches the porous central tube 18.

As perhaps best seen in FIG. 3, the cartridge 10 is assembled by forming one or more composite leaves and then wrapping this assembly about the central tube 18, as by rotating the tube (see FIG. 4). The central tube may extend out one or both ends of the casing, and the winding will be at an intermediate location along the tube wherein a series of holes or perforations 20 will be located so as to provide communication through the sidewall of the tube in the area where the winding will be located. As shown in FIG. 5, the tube may be first wound with the end of a length 12a of a sheet of felt material or the like that will serve as the permeate carrier which can be attached to the tube by bands of adhesive 26 located along inner end of the sheet and along both lateral edges, which adhesive also serves to seal the lateral edges of the permeate carrier winding to prevent the entry thereinto of the feed mixture at either the inlet plenum or the outlet plenum. Sufficient adhesive 26 is provided so that it will soak through the porous layer and also provide a bond to the membrane 14 itself.

One or more sandwiches of semipermeable membrane 14 folded about a length of a sheet of feed carrier material 16 (See FIG. 3) are then arranged in position with the membrane fold residing closest to the central tube 18 If two or four sets of sandwiches are employed, as shown in FIG. 3, then one or more additional lengths of permeate material 12 are provided so that, in the windings, the membrane sandwiches are always separated from one another by a length of permeate material 12. These additional lengths of permeate carrier 12 can be adhesively or otherwise suitably affixed to the outer surface of the wrapping of the longest length 12a (see FIG. 3) and would also have bands of adhesive material 26 saturating both lateral edges. Thus, in the final assembly, the interior surfaces of the doubled-over membrane sheet 14 which lie next to the feed carrier sheet 16 will be the active or dense surface of the membrane, if it is an asymmetric membrane or a composite membrane, and these surfaces will be in contact with the feed mixture being treated (as seen in FIG. 2A).

When the winding takes place, the crease of the folded membrane 14 with its interleaved feed carrier 16 will be in the nip between the leaves 12 of permeate carrier and adjacent the initially wrapped central tube 18. As the tube is rotated (see FIG. 4), the spiral winding is formed, and the porous permeate carrier 12 becomes secured along both of its surfaces to the adjacent nonactive or supporting membrane surface via the adhesive bands 26. A further band of adhesive is also laid down along the remote end of each permeate carrier sheet so that there is a complete seal or blockage along the lateral and outer edges of the permeate layer sheets and attachment of these edges to the three unfolded edges of the semipermeable membrane sheets 14. As a result, the only entry to the porous permeate carrier is through the minute pores in the semipermeable membrane through which the substantially pure first component passes.

After the final turn is taken to complete the winding of the cartridge, the feed carrier layer 16 may be allowed to extend around the cylindrical body so that it forms an outer overlayer and then secured in place by plastic tape or the like or the entire exterior of the cartridge 10 can be wrapped with plastic tape 22 as shown in FIG. 1. Depending upon the overall design of the unit 38, the cartridge 10 can be proportioned to have a diameter such that it will fit snugly inside the pressure-resistant casing 38 of the unit, or a peripheral cheveron-type or some other suitable seal 39 can be included to control flow of the feed mixture through this region along the exterior of the cartridge. The feed enters the unit 38 through a center inlet 36, and the relatively pure permeating component exits through the open end of the tube 18 which serves as the permeate discharge outlet 40. If needed to maintain a minimum desired pressure in the feed passageways through the spiral cartridge 10, a restrictor 42 or some other pressure regulator can be located in the side outlet 44 for the concentrate.

As can be seen in FIG. 5, the final cartridge includes the central tube, which has a plurality of perforations 20, surrounded by a layer 12a of the permeate carrier material adjacent which are located the folded panels of semipermeable membrane sandwiching the feed carrier sheets 16. The semipermeable membrane sandwiches are spaced apart by the leaves of the permeate carrier material 12 throughout the spiral-wound cartridge. The semipermeable membrane material 14 can be of any of the well known reverse-osmosis or ultrafiltration membranes that have been developed over the past thirty years. They can be of the asymmetric type, such as the cellulose acetate membranes disclosed in U.S. Pat. Nos. 3,133,137 and 3,344,214 wherein a thin, active, dense layer is formed at one surface of cast polymeric material by selective evaporation or the like, whereas the remainder of the membrane throughout and extending to the other surface is of a much more porous composition which tends to integrally support the dense active surface layer which exhibits the semipermeable characteristics. Alternatively, the recently developed composite membranes can be employed wherein a dense, active layer is formed of a chemically different material than the nonactive supporting layer, examples of these being shown in U.S. Pat. Nos. 4,259,183 and 4,265,745. Such composite membranes can be made by any suitable method; however, frequently an interfacial condensation reaction is carried out whereby a thin film is formed by reactants which create a thin, dense, polymeric surface, such as a polyamide having the desired semipermeable characteristics. The porous, less dense, supporting layer adjacent which the interfacial condensation reaction takes place can be of any suitable polymeric material, such as a polysulfone, having the desired pore size to adequately support the ultra-thin, interfacial layer without creating undesirably high pressure drops across it. Suitable ultrafiltration membranes can be made by casting suitably porous membranes from polysulfone or by using other polymeric materials well known in this art, and this feed carrier material is felt to be particularly advantageous for use with ultrafiltration membranes, which for purposes of this application are considered to be membranes which will not reject soluble salts or organics below about 5000 molecular weight.

Generally, materials that will be used for the construction of these cartridges will be selected by those having the ordinary skill in the art for the particular application in question. The central tubes 18 may be of any suitable materials compatible with the intended commercial use. For example, high strength plastic materials, such as polyvinylchloride, can be employed. The permeate transfer leaves may be of porous felt or fabric material, as well known in the art, and felts sold under the brand name "Tricot", made of polyester material are frequently used. The permeate carrier layer can also be a coated woven material, such as a Tricot polyester or an epoxy or melamine-coated polyester material. The adhesives used to bond the material can be of the polyurethane type, as well known in this art; epoxy resin formulations having suitable setting times can alternatively be employed, as well as other polymeric adhesives such as those which are polymers or copolymers of vinyl resins.

The present invention is directed to improvements in the feed-carrier material 16 which provides passageways which extend axially from the input to the discharge end of the cartridge 10, which are spiral in overall cross-section as a result of the spiral winding about the central tube 18. The function of the feed-carrier material 16 is to space the facing, active surfaces of the panels of semipermeable membrane 14 apart from each other so that the feed mixture, which is being pumped through the cartridge usually at an inlet pressure of at least about 75 psig., can flow in contact with both active surfaces through which permeation occurs. As in any fluid flow application, the pressure drop is desirably maintained at a relatively low level, and by minimizing pressure losses in cartridges of this type, it will often be feasible to connect from two to ten or more such cartridges in series flow arrangement without exposing the first cartridge to undesirably high pressures. It has been found that, by employing extremely porous or open, channel-forming grid material 16 to create the feed passageways, extremely low pressure drops can be achieved without undesirably affecting the rate of permeation that occurs through membrane panels 14 of most semipermeable materials.

Commonly, an ultrafiltration or reverse-osmosis membrane is cast upon a thin layer of polypropylene felt backing material which essentially integrally supports the membrane material against puncture and excessive deformation even when high feed pressures are employed. Inasmuch as this aspect of the cartridge is not directly involved with the particular improvement of the present application, such a polypropylene felt backing layer, if included, is merely herein considered as being part of the membrane itself, lying adjacent to its nonactive surface and being sealed along its three outer edges by the same adhesive 26 which saturates the edges of the permeate carrier material 12.

The feed-carrier layer 16 is preferably formed of a polymeric material having a plurality of equally spaced parallel ribs 50 of equal size; the height of the ribs generally determines the spacing between the facing semipermeable membrane sheets 14 in the spirally-wound cartridge 10. The ribs 50 can be of a circular or even an irregular cross-section, but they are preferably of generally rectangular cross-section with the longer dimension of the rectangle thereby constituting the height of the rib and therefore determining the effective thickness of the feed-carrier layer and the spacing between the facing sheets of semipermeable membrane. The ribs could also be of square cross-section or any other suitable cross-section, but preferably they have smooth surfaces representative of extruded thermoplastic materials. The thickness of the feed carrier layer (i.e., the height of the ribs) can range between about 0.15 inch and about 0.03 inch. The thickness of the feed-carrier material chosen may also be dependent upon the overall diameter of the cartridge because it will affect the total amount of surface area of membrane that can be incorporated within such a spiral cartridge of given diameter and length. Preferably, the thickness of the feed-carrier layer is between about 50 mils (0.050 inch) and about 90 mils, which thicknesses are considered to be perfectly suitable for employment in cartridges having lengths of up to about 70 inches from input to discharge end, or even longer lengths. The thickness used may also depend upon the particular application for which the cartridge will be used; for example, the pressure that will be employed and the nature of the membrane in question are factors to be considered. There are certain applications for which spacers of about 35 mils thickness are perfectly suitable; of course, the thinner a feed-material carrier 16 is, the more total surface area of membrane it should be possible to include in a spiral cartridge of a given outer diameter.

The ribs 50 are uniformly spaced apart from one another in a parallel grid-like formation which assures equal spacing between adjacent ribs. Preferably, the ribs may be spaced apart a distance equal to or between about 3 and about 10 times the width or diameter of the ribs. This uniform spacing is achieved by the use of cross filaments 52 which are arranged so as to preferably extend parallel to one another and transverse or generally perpendicular to the ribs 50. The cross filaments 52 are themselves uniformly spaced from one another and are of a height less than half the height of the ribs, and preferably less than about 25% of the height of the ribs. The spacing between adjacent filaments 52 is preferably between about 0.5 and about 1.5 times the spacing between the ribs, providing an overall open grid pattern for the sheet material in plan view. Although theoretically it would seem preferable for the filaments to be located midway between the upper and lower surfaces of this sheet-like feed-carrier material 16, the nature of manufacture is such that the filaments 52 are more conveniently located adjacent one surface of the material, i.e., so the junctions between the cross-filaments and the ribs are all located either at the top or the bottom of the rectangles; however, the performance of the cartridge does not appear to be influenced adversely as a result of such off-center location. Polymeric grid material having these characteristics made of polypropylene can be obtained from the Conwed Plastics Corporation as well as from the Nalle Plastics Corporation. The employment of such feed-carrier materials 16 in a spiral cartridge 10 creates axially extending channels throughout the spiral cartridge from one end to the other and results in a much lower pressure drop in the feed mixture that is being pumped therethrough than occurs in a similar cartridge using the Vexar material that has been standard in such cartridges for a number of years.

Spiral-wound separation cartridges utilizing these feed-carrier materials are considered to be particularly useful in the separation of components from liquid mixtures, such as contaminated aqueous solutions, and they have been found to be particularly valuable when the contaminated feed contains a relatively high amount of suspended solids. Suspended solids of a size too small to be removed by standard prefilter units may result in irreversible plugging in spiral-wound cartridges having the so-called Vexar screen material commonly used commercially in the U.S. today. Comparable spiral-wound cartridges employing the channel-providing feed layers in accordance with the present invention show little or no feed channel plugging and comparable initial permeation performance. In general, two of the characteristics of these cartridges incorporating feed carriers of particular importance are their resistance to plugging of the membranes by suspended solids and the ability to promote shear stress in the flowing stream at the surface of the membrane, which shear stress is believed to contribute to both the resistance to plugging and to favorable permeation flow through the membrane.

The thickness of the feed-carrier layer has a direct relation to the amount of total membrane surface area that can be incorporated within a spiral-wound module of given diameter and length. The so-called standard module, upon which comparison is based, is that using a cross grid of spacer material obtained from Nalle, which has now replaced the previously employed woven material, and which is marketed as Nalle MP- 104 having a thickness of 30 mils and consisting of a square grid pattern of strands of equal diameter constituting essentially upper and lower layers of respectively parallel strands both oriented at 45° to the direction of flow axially through the spiral-feed-mixture passageway. Compared to such a standard module, a spiral-wound module employing a 50 mil thick channel-like feed carrier as described hereinbefore, the standard module would have about 1.23 times more total surface area. Likewise, the standard module would have nearly twice as much membrane surface area as would a module made using the 90 mil thick, channel-type feed-carrier material. However, even though the total surface area of the membrane module is lower, under certain conditions, the total output flow of permeate per cartridge is comparable or greater and from the standpoint of length of operation without the necessity to shut down for back-flushing and/or other cleaning, the long term output of membrane modules incorporating features of the present invention can greatly exceed those of comparable membrane modules incorporating the standard Vexar feed spacer material.

In one test on the dewatering of the discharge of an aqueous cutting oil emulsion having suspended solids that increased the tendency to foul and plug the membranes, testing was carried out with a cartridge having the standard 30 mil thick Vexar spacer versus one having a 90 mil thick channel-type material both using Teflon-type semipermeable membrane. Both gave oil-free permeate; however, at an average input pressure of about 35 psi, the pressure drop in the standard membrane cartridge of 2.5 inches diameter and of 40 inches length was 10 psi whereas the cartridge utilizing the 90 mil feed-carrier exhibited a pressure drop of only 4 psi when both were operated at a feed flow rate 4 gal./min. Moreover, the cartridges utilizing the 90 mil material were nearly twice as efficient over a period of 30 days, producing 17.6 gallons per square foot per day (gfd) versus about 8.6 gfd for the standard cartridge. At the conclusion of the test, back-flushing and cleaning with an alkaline degreaser were carried out, and subsequent testing with plain tap water showed that the effects of the fouling were still present inasmuch as the gfd of about 55.6 for the channel-type feed-carrier cartridge was slightly more than twice that of the 27.2 gfd value obtained for the standard spiral membrane cartridge. Therefore, although the standard membrane includes nearly twice the total surface area of membrane, the total output of both are substantially the same because of the nearly double gfd value and the lower pressure drop; however, the greater long term resistance to fouling makes the cartridge containing the 90 mil feed-carrier material the clear choice for this particular treatment application. It thus appears that, with a feed mixture to be treated, such as an oily, aqueous waste having a high tendency to foul the membrane, the use of spiral-wound cartridges employing the channel-type feed material will be of very significant advantage.

With particular respect to the improvement in the pressure drop through a spiral-wound membrane, tests were run with cartridges 40 inches in length, using the standard Vexar material and using three different channel-type feed-carrier materials of respectively 33 mils, 50 mils and 90 mils in thickness. Whereas the Vexar standard module had a pressure drop, at a feed flow of 20 gallons per minute (gpm), of about 10 psi, the 33 mil material showed a pressure drop of only 6 psi, the 50 mil material a drop of only about 2 psi, and there was no measurable pressure drop with respect to the 90 mil material, all at the same feed flow of 20 gpm. It can be appreciated that this very significantly smaller pressure drop can offer substantial advantages in utilizing two or more membrane cartridges in series flow, particularly within a single elongated outer casing, which should improve overall performance and furthermore will be even of greater advantage when a feed mixture having a tendency to foul the membrane is being treated. Moreover, this minimal pressure drop when utilizing the 90 mil thick material offers significant advantages from the standpoint of being able to create arrays of membrane cartridges in series and parallel arrangements because the decrease in pressure becomes of minor significance. Although an even thicker material having ribs of a height of about 150 mils has been tested, this further increase in thickness creates a cartridge having only about one-third the total surface area of the standard cartridge, and although it performs acceptably, at the present time it does not seem to have any advantage over the 90 mil material which has generally no measurable pressure loss when operating on a clean feed.

Another advantage of the cartridges utilizing the channel-type feed carriers is the ability to clean the feed channels through the use of either back-flushing or forward-flushing with relatively high velocity liquid flow. This is of particular value when a feed mixture containing minute suspended solids is being treated, because cartridges having such negligible pressure drops make high velocity flushing to remove these accumulations quite feasible, and as a result, overall performance of such an installation is further increased. In general, the cartridges made in accordance with the present invention are felt to be particularly valuable for use with feed mixtures including suspended solids, as well as with aqueous mixtures of partially soluble solids, such as glycols, oils and proteins, and those of high viscosity.

The particular application in question for which a cartridge will be used will be instrumental in determining the preferred characteristics for the channel-type feed-carrier material. For example, when the feed mixture being treated has a fairly high amount of suspended solids, the 50 or the 90 mil thick material is preferred because it has the greatest resistance to plugging and also facilitates flushing and cleaning when such eventually becomes necessary. On the other hand, a channel-type material about 30 mils thick may be used in the treatment of brackish water or may be used in separating a component from a gaseous mixture, applications where plugging is not considered to be a problem.

Cartridges using these spacers are considered to be particularly valuable for concentrating solutions having a viscosity of about 50 centipoises or higher where standard cartridges are generally ineffective. As an example of one commercial application, cartridges using the channel-like spacers are employed when an aqueous solution of polyvinyl alcohol (PVA) is being concentrated. The incoming stream of material is an approximately 2 weight percent aqueous solution at a temperature of about 180° F., and it is desired to concentrate the solution to an about 13 weight percent PVA solution, at which percentage it is quite viscous, i.e., having a viscosity of about 88 centipoises which is about 7 times its initial viscosity. Membrane cartridges are fabricated having an outer diameter of about 8 inches and a length of about 40 inches. The cartridges are made using a polysulfone ultrafiltration membrane which is laid down on a polyester nonwoven base. The permeate carrier layer is Tricot felt having a thickness of about 0.012 inch, the edges of which are secured to the facing membrane surfaces using an adhesive of polyurethane. Cartridges are rolled using the standard Vexar material having a thickness of 30 mils, and several of these are retained for comparison test purposes. The remainder of the cartridges are unrolled after the adhesive has set, and the Vexar is removed and 50 or 90 mil thick channel-type feed layer material is substituted. When channel-type feed layers of about 50 mils thick or less are used in 4 inch diameter cartridges, they are rolled directly and need not be substituted after the adhesive sets. The ribs are 50 mils high and rectangular in shape having a thickness of about 20 mils. They are spaced apart so that the distance between adjacent ribs is about 150 mils. The cross-filaments are about 10–15 mils high and are similarly spaced apart about 150 mils to create a generally square-type grid of polypropylene material. Accordingly, the spacing of both the ribs and the cross-filaments is about 5–6 to the inch.

The 2% solution is pumped separately through standard cartridges and through the cartridges using the 50 mil feed-carrier material at an entry pressure of about 85 psig. In the standard modules, it has a flow rate therethrough of about 45 gallons per minute whereas in the cartridges using the 50 mil feed carrier layer, it has a flow rate of about 80 gallons per minute. The amount of permeate from the standard cartridges is initially about 1.5 gfd, whereas the amount of permeate from the improved cartridges is about 3.5 gfd. After about 1 hour, the permeate from the standard cartridge begins to sharply drop off, showing that clogging is beginning to occur. In contrast, the improved cartridge continues to function at about the same rate with no noticeable dropoff for about 5 days, at which time a very slow decrease in permeate begins to occur. By using a series of the improved membrane cartridges, the 2% PVA solution can be effectively concentrated to a 13% solution. Even the cartridges operating on the most concentrated feed solution have pressure drops within acceptable limits, i.e., about 10 psi, and are able to operate continuously for a period of about 5 days before requiring cleaning. Thus, these cartridges are considered to perform quite advantageously, and it is believed that they are suitable for the commercial concentration of water-soluble polymers, such as polyvinyl materials.

The invention provides significant improvements in spiral membrane cartridge performance, and these advantages are believed to hold true for semipermeable membranes, both of the ultrafiltration and the reverse-osmosis types, although they may be particularly advantageous for ultrafiltration separations. Although they are particularly useful for separating components from a dirty aqueous solution or a liquid mixture containing suspended solids, depending upon the character of the membrane itself, the cartridges could also be utilized to separate, concentrate or clean organic liquids and could be used for the fractionation of gas mixtures. Moreover, because they have extremely low or sometimes even negligible pressure drops, they can be used in relatively low pressure environments, thus reducing the cost of the other materials that make up the cartridge and making for a more economic overall operation both from the standpoint of cost of materials and operating costs. In another application, 11 cartridges of 8" diameter and 40" length made with membranes having "loose" reverse osmosis characteristics and 50 mil channel-type spacer material have been coupled in series and exhibit a pressure drop of less than 5 psi per cartridge while being used to efficiently recover 70% of the volume of water in a particularly dirty discharge from an olive processing installation containing 150 ppm olive oil, 1000 ppm suspended solids, 5000 ppm partly soluble matter and 2500 ppm soluble salts.

Although the invention has been illustrated and described with regard to certain preferred embodiments, it should be understood that changes and modifications as would be obvious to one having the ordinary skill in this art may be made without deviating from the scope of the invention, which is set for in the appended claims. For example, although the invention could be used in cartridges which are operated at high pressures, it is considered to be an advantage that the invention allows most separations to be performed at pressures not exceeding about 125 psig. Particular features of the invention are emphasized in the claims that follow.

What is claimed is:

1. A spiral wound membrane cartridge for separating a first component from a fluid mixture of the first component and a second component, which cartridge comprises a porous sheetlike membrane having pores sized to allow passage of the first component in a generally transverse direction while rejecting passage therethrough of the second component, said membrane being spirally wound about a central tube, a feed carrier layer of non-woven channel material having a plurality of generally parallel ribs of similar size of extruded polymeric material spaced apart from one another, said ribs being interconnected by smaller filaments which extend transverse to said ribs and maintain said spacing and form feed-carrying channels extending in a direction of flow parallel to the axis of said tube, said filaments having a thickness less than one-half the thickness of said ribs and being aligned generally perpendicular to said ribs, said feed carrier layer being disposed adjacent a supply surface of said membrane; and a permeate carrier layer disposed adjacent a discharge surface of said membrane, said permeate carrier extending spirally inward to said central tube which is adapted to conduct the discharge flow of the first component from said cartridge.

2. The cartridge of claim 1 wherein said channel material comprises polypropylene ribs arranged to provide between 3 and about 10 channels per inch.

3. The cartridge of claim 1 wherein said carrier layer comprises propylene ribs and filaments, has been about 4 and about 10 channels per inch, and has said filaments arranged in a plane located along either the top or the bottom of said spaced ribs.

4. The cartridge of claim 1 wherein an assemblage containing at least two sheets of said membrane arranged in flanking position to a sheet of feed channel material and also containing said permeate carrier layer is wound spirally about said central tube.

5. The cartridge of claim 4 wherein said membrane is folded at an inner edge adjacent said central tube to create a sandwich of said feed carrier layer between two sections of each sheet of membrane.

6. The cartridge of claim 1 wherein said membrane is an ultrafiltration membrane.

7. A spiral wound membrane cartridge for separating a first component from a fluid mixture of the first component and a second component, which cartridge comprises a porous sheetlike membrane having pore sized to allow passage of the first component in a generally transverse direction while rejecting passage therethrough of the second component, said membrane being spirally wound about a central tube, a feed carrier layer of non-woven channel material having a plurality of generally parallel ribs of similar size of extruded polypropylene spaced apart from one another, said ribs being interconnected by smaller filaments of polypropylene which extend transverse to said ribs and maintain said spacing and form between about 4 and about 10 feed-carrying channels per inch extending in a direction of flow parallel to the axis of said tube, said ribs being generally rectangular in cross-section and said filaments arranged in a plane located along either the top or the bottom of said rectangular ribs, the spacing between said filaments being between about 0.5 and about 1.5 times the spacing between said ribs, said feed carrier layer being disposed adjacent a supply surface of said membrane; and a permeate carrier layer disposed adjacent a discharge surface of said membrane, said permeate carrier layer extending spirally inward to said central tube which is adapted to conduct the discharge flow of the first component from said cartridge.

8. The cartridge of claim 7 wherein said filaments have a thickness less than one-half the thickness of said ribs and are generally perpendicular to said ribs.

9. The cartridge of claim 8 wherein an assemblage containing at least two sheets of said membrane arranged in flanking position to a sheet of feed channel material and also containing said permeate carrier layer is wound spirally about said central tube.

10. The cartridge of claim 9 wherein said membrane is folded at an inner edge adjacent said central tube to create a sandwich of said feed carrier layer between two sections of each sheet of membrane.

11. The cartridge of claim 7 wherein said membrane is an ultrafiltration membrane.

12. A spiral wound membrane cartridge for separating a first component from a fluid mixture of the first component and a second component, which cartridge comprises a porous sheetlike membrane having pores sized to allow passage of the first component in a generally transverse direction while rejecting passage therethrough of the second component, said membrane being spirally wound about a central tube, a flexible feed carrier layer of sheetlike material having a plurality of generally parallel ribs of similar size of extruded polymeric material spaced apart from one another and interconnected by smaller filaments which extend transverse to said ribs and maintain said spacing to form feed-carrying channels, the regions between said parallel ribs being open except for said filaments, said feed carrier layer being wound spirally with said membrane and disposed within said spiral winding adjacent a supply surface of said membrane and oriented so that said channels extend in a direction of flow parallel to the axis of said tube, said ribs providing between 3 and about 10 channels per inch, being generally rectangular in cross-section and being oriented so that the longer dimension of said rectangular ribs defines the thickness of said feed carrier layer, said filaments having a thickness less than one-half the thickness of said ribs and being located to lie in a plane along either surface of said sheetlike material, and a permeate carrier layer disposed adjacent a discharge surface of said membrane, said permeate carrier extending spirally inward to said central tube which is adapted to conduct the discharge flow of the first component from said cartridge.

13. The cartridge of claim 12 wherein said filaments are perpendicular to said ribs and space said ribs apart a distance equal to between about 3 and about 10 times the thickness of the ribs.

14. The cartridge of claim 13 wherein an assemblage containing at least two sheets of said membrane arranged in flanking position to a sheet of feed channel material and also containing said permeate carrier layer is wound spirally about said central tube.

15. The cartridge of claim 14 wherein said membrane is folded at an inner edge adjacent said central tube to create a sandwich of said feed carrier layer between two sections of each sheet of membrane.

16. The cartridge of claim 12 wherein said membrane is an ultrafiltration membrane.

* * * * *

UNITED STATES PATENT AND TRADEMARK OFFICE
CERTIFICATE OF CORRECTION

PATENT NO.   :   4,902,417
DATED        :   February 20, 1990
INVENTOR(S)  :   Larry A. Lien It is certified that error appears in the above-identified patent and that said Letters Patent is hereby corrected as shown below:

Column 3, line 11, insert a period after "18".

Column 10, line 52, "propylene" should be --polypropylene--, and same line, "been" should be --between--.

Signed and Sealed this

Tenth Day of September, 1991

Attest:

HARRY F. MANBECK, JR.

Attesting Officer

Commissioner of Patents and Trademarks